United States Patent
Zhu et al.

(10) Patent No.: US 10,244,083 B2
(45) Date of Patent: Mar. 26, 2019

(54) METHOD, APPARATUS AND SYSTEM FOR USING A USER EQUIPMENT AS A SMALL EVOLVED NODEB FOR A SMALL CELL

(71) Applicant: INTEL CORPORATION, Santa Clara, CA (US)

(72) Inventors: Yuan Zhu, Beijing (CN); Yuan Zhang, Beijing (CN); Yinhui Liu, Beijing (CN); Ning Zou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/511,571

(22) PCT Filed: Oct. 16, 2014

(86) PCT No.: PCT/CN2014/088741
§ 371 (c)(1),
(2) Date: Mar. 15, 2017

(87) PCT Pub. No.: WO2016/058161
PCT Pub. Date: Apr. 21, 2016

(65) Prior Publication Data
US 2017/0302763 A1    Oct. 19, 2017

(51) Int. Cl.
*H04W 4/24*     (2018.01)
*H04L 29/06*    (2006.01)
(Continued)

(52) U.S. Cl.
CPC .............. *H04L 69/08* (2013.01); *H04L 5/001* (2013.01); *H04L 12/1435* (2013.01);
(Continued)

(58) Field of Classification Search
CPC ..... H04W 76/046; H04W 4/24; H04W 8/205; H04L 69/08
See application file for complete search history.

(56) References Cited

U.S. PATENT DOCUMENTS

| 2014/0226663 | A1* | 8/2014 | Chan ...................... H04L 45/741 370/392 |
| 2015/0181483 | A1* | 6/2015 | Tabet .................... H04W 76/10 370/252 |
| 2016/0029228 | A1* | 1/2016 | Mufti .................... H04W 24/04 370/225 |

FOREIGN PATENT DOCUMENTS

| CN | 102523598 A | 6/2012 |
| CN | 102546403 A | 7/2012 |
| CN | 103370958 A | 10/2013 |
| JP | 2009504051 A | 1/2009 |

(Continued)

OTHER PUBLICATIONS

International Search Report and Written Opinion dated Apr. 29, 2015 from International Application No. PCT/CN2014/088741, 13 pages.

(Continued)

*Primary Examiner* — Wei Zhao
(74) *Attorney, Agent, or Firm* — Schwabe, Williamson & Wyatt, P.C.

(57) ABSTRACT

A device, method and system of using a first user equipment (UE) as a small evolved NodeB (eNB) for a small cell may comprise receiving a first long term evolution (LTE) packet from a second UE over the small cell; converting the first LTE packet into a first transmission control protocol/Internet protocol (TCP/IP) packet, wherein the converting includes retrieving payload data from the first LTE packet and encapsulating the payload data into the first TCP/IP packet by adding a TCP/IP header to the payload data, and wherein the TCP/IP header includes an IP address of an Evolved Packet Core (EPC) network associated to Internet based on a TCP/IP tunneling protocol; and transmitting the first TCP/IP packet to an Internet destination via the EPC connected with the first UE through an Internet server over a local area network (LAN).

22 Claims, 5 Drawing Sheets

(51) Int. Cl.
*H04W 76/27* (2018.01)
*H04W 88/04* (2009.01)
*H04L 5/00* (2006.01)
*H04L 12/14* (2006.01)
*H04W 8/20* (2009.01)
*H04W 84/20* (2009.01)
*H04W 84/22* (2009.01)

(52) U.S. Cl.
CPC ............ *H04L 69/167* (2013.01); *H04W 4/24* (2013.01); *H04W 8/205* (2013.01); *H04W 76/27* (2018.02); *H04W 88/04* (2013.01); *H04W 84/20* (2013.01); *H04W 84/22* (2013.01)

(56) References Cited

FOREIGN PATENT DOCUMENTS

| | | |
|---|---|---|
| JP | 2011526135 A | 9/2011 |
| JP | 2013528020 A | 7/2013 |
| WO | 2014113141 A1 | 7/2014 |
| WO | 2014158273 A1 | 10/2014 |

OTHER PUBLICATIONS

Japanese Patent Office—Notice of Reasons for Rejections dated May 8, 2018 from Japanese Patent Application No. 2017-516881, 8 pages.

* cited by examiner

```
┌─────────────────────────────────────────────┐
│ convert an advance UE to a master UE and    │
│ configure the master UE with ability of     │
│ serving a plurality of slave UEs            │
│                    301                      │
└─────────────────────────────────────────────┘
                      │
                      ▼
┌─────────────────────────────────────────────┐
│ connect with the Internet cloud via a LAN   │
│ network including PC and LAN modem,         │
│ register at the cloud to indicate its       │
│ identity and data billing plan              │
│                    302                      │
└─────────────────────────────────────────────┘
                      │
                      ▼
┌─────────────────────────────────────────────┐
│ receive a LTE packet from a slave UE and    │
│ convert the LTE packet to a TCP/IP packet   │
│                    303                      │
└─────────────────────────────────────────────┘
                      │
                      ▼
┌─────────────────────────────────────────────┐
│ transmit the TCP/OP packet to the cloud via │
│ the LAN network, which further transfer the │
│ packet to the EPC                           │
│                    304                      │
└─────────────────────────────────────────────┘
                      │
                      ▼
┌─────────────────────────────────────────────┐
│ billing the served data according to the    │
│ data/billing plan at the billing server via │
│ the cloud                                   │
│                    305                      │
└─────────────────────────────────────────────┘
```

Fig. 3

METHOD, APPARATUS AND SYSTEM FOR USING A USER EQUIPMENT AS A SMALL EVOLVED NODEB FOR A SMALL CELL

CROSS REFERENCE TO RELATED APPLICATIONS

The present application is a national phase entry under 35 U.S.C. § 371 of International Application No. PCT/CN2014/088741, filed Oct. 16, 2014, entitled "METHOD, APPARATUS AND SYSTEM FOR USING A USER EQUIPMENT AS A SMALL EVOLVED NODEB FOR A SMALL CELL", which designated, among the various States, the United States of America and is hereby incorporated by reference.

BACKGROUND INFORMATION

User device to device communications may be used to enhance communications between the user devices with no or minimum assistance from a wireless network, especially, in compliance with the Long Term Evolution (LTE) standards of 3rd Generation Partnership Project along with any amendments, updates and/or revisions.

The user device, such as a user equipment (UE) with LTE communication module may be used as a small evolved NodeB (SeNB) for a small cell (alternatively, called as a pico cell or a femto cell), to communicate with other UEs.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 schematically illustrates a method of handling communication in the first wireless communication system in accordance with various embodiments.

DESCRIPTION OF THE EMBODIMENTS

Illustrative embodiments of the present disclosure include, but are not limited to, methods, systems, and apparatuses for handling in-device coexistence interference in a wireless network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a programmable logic, a processor (shared, dedicated, or group) and/or memory (shared, dedicated, or group) that execute one or more software or firmware programs, a combinational logic circuit, and/or other suitable components that provide the described functionality.

Figure 1:
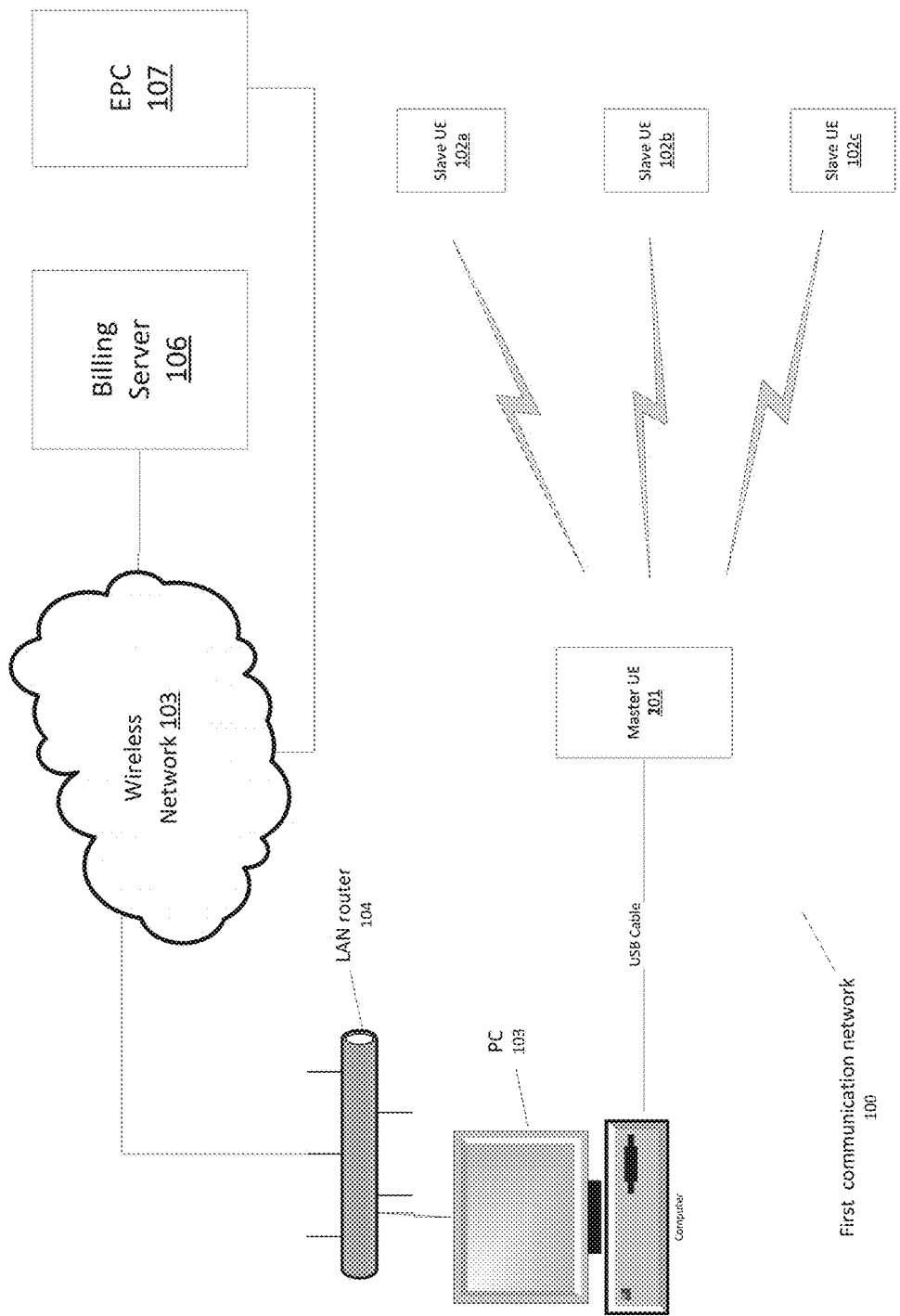
FIG. 1 schematically illustrates a first wireless communication system in accordance with various embodiments.

FIG. 1 schematically illustrates a first wireless communication system 100 in accordance with various embodiments. As illustrated, the first wireless communication system 100 may comprise a master user equipment (UE) 101, a plurality of slave UEs 102a-102c, a personal computer (PC) 103, a local area network (LAN) router 104, an Internet cloud 105, a billing server 106 and an evolved packet core (EPC) 107, and/or others.

In accordance with various embodiments, the master UE 101 may be embodied as, without limitation, a smart phone, a cellular telephone, a tablet, a consumer electronic device, a laptop computer, a notebook computer, a mobile computing system, a processor-based system, and/or any other mobile communication device configured to be used as a small evolved Node B (eNB) for a small cell. Any of the slave UE 102a-102c may be embodied as, without limitation, a smart phone, a cellular telephone, a tablet, a consumer electronic device, a laptop computer, a notebook computer, a mobile computing system, a processor-based system, and/or any other mobile communication device configured to be served by the master UE.

In some embodiments, the master UE 101 may be an advanced UE equipped with multiple communication modules, such as a Long Term Evolution (LTE) module in compliance with the Long Term Evolution (LTE) standards of 3rd Generation Partnership Project along with any amendments, updates and/or revisions, a WiFi module in compliance with IEEE 802.11 specifications, and/or others. That the advanced UE acts as the master UE means that the master UE 101 may be configured with abilities of serving the slave UEs 102a-102c as a small eNB for transmitting/receiving LTE packets to/from the slave UEs 102a-102c. In order to implement this function, the master UE, which supports Frequency Division Duplex (FDD), may be configured with ability of converting its transmission/receiving frequencies of one carrier (namely, transmission frequency 1.9 GHz and receiving frequency 2 GHz) as receiving/transmission frequency (namely, receiving frequency 1.9 GHz and transmission frequency 2 GHz), ability of sending broadcasting, synchronization, paging and so on, ability of switching transmission protocol from uplink transmission protocol, such as single carrier, to downlink transmission protocol, such as orthogonal frequency division multiplexing (OFDM), and/or others. In some embodiments, a user interface of the master UE 101 may provide a method, such as a button, for the user to select ON/OFF of switching between the master UE mode and normal UE mode.

In some embodiments, the master UE 101 and the slave UEs 102a-102c may detect existence of each other in proximity, before establishing a LTE connection between them. The master UE 101 may receive a LTE packet from a slave UE (e.g., a slave UE 102a). The master UE 101 may convert the LTE packet into a transmission control protocol/Internet protocol (TCP/IP) packet. For an instance, the master UE 101 may retrieve payload data from the LTE packet and encapsulate the payload data into a TCP/IP packet based on the TCP/IP tunneling protocol, such as adding TCP/IP header including the IP address of EPC to the payload and so on. The master UE may further transmit the TCP/IP packet to the Internet cloud 105 via a local area network including the PC 103 which may be connected with the master UE 101 via an input/output (I/O) port (e.g., an universal serial bus (USB) port), a LAN router 104 which may connect the PC to the Internet, and/or others. The Internet cloud 105 may further route the TCP/IP packet to the EPC. The EPC will remove the TCP/IP header added by the master UE and forward the encapsulated data to its real destination. In some embodiments, although not illustrated in FIG. 1, the EPC 107 may comprise a mobility management entity (MME), a serving-gateway (S-GW), a packet data network-gateway (PDN-GW), a serving GPRS support node (SGSN), etc.

In some embodiments, the master UE 101 may convert the LTE packet into a TCP/IP packet by removing the LTE MAC header. Alternatively, the master UE may send the TCP/IP packet originated from the slave UEs 102a-102c directly to its destination (e.g., an internet server) without routing through the EPC 107. The master UE may further send control information including served data volume to the EPC 107 or billing server 106 using TCP/IP protocol. EPC/billing server may use these control information for statistics or billing purposes.

In some embodiments, if the master UE 101 serves any of the slave UE 102a-102c with a billing rate based on a slave UE's data plan which may suggest, for example, the master UE 101 may charge 20% of the data transmission between the slave UEs 102a-102c and the Internet, the Internet cloud 105 may further connect to the billing server 106, which may record the billing rate for the data transmission between the slave UEs 102a-102c and the Internet and also add remaining bytes into Master UE's data plan.

It should be understood that although the data transmission between the slave UEs 102a-102c and the Internet (e.g., a destination server) has been described in the above, the same or similar concept should be able to be adoptable for the data transmission from the Internet to the slave UEs 102a-102c.

The first wireless communication system 100 as illustrated may be useful for indoor LTE network coverage, especially, when quality of the indoor LTE network coverage is poor. In the first wireless communication system 100, the small cell may be deployed to provide additional coverage where there is limited or no LTE coverage from the slave UEs' operator. Even if the slave UEs' operator may have coverage, master UE may be able to offer much higher throughput because the same bandwidth is shared by much smaller number of UEs.

Figure 2:
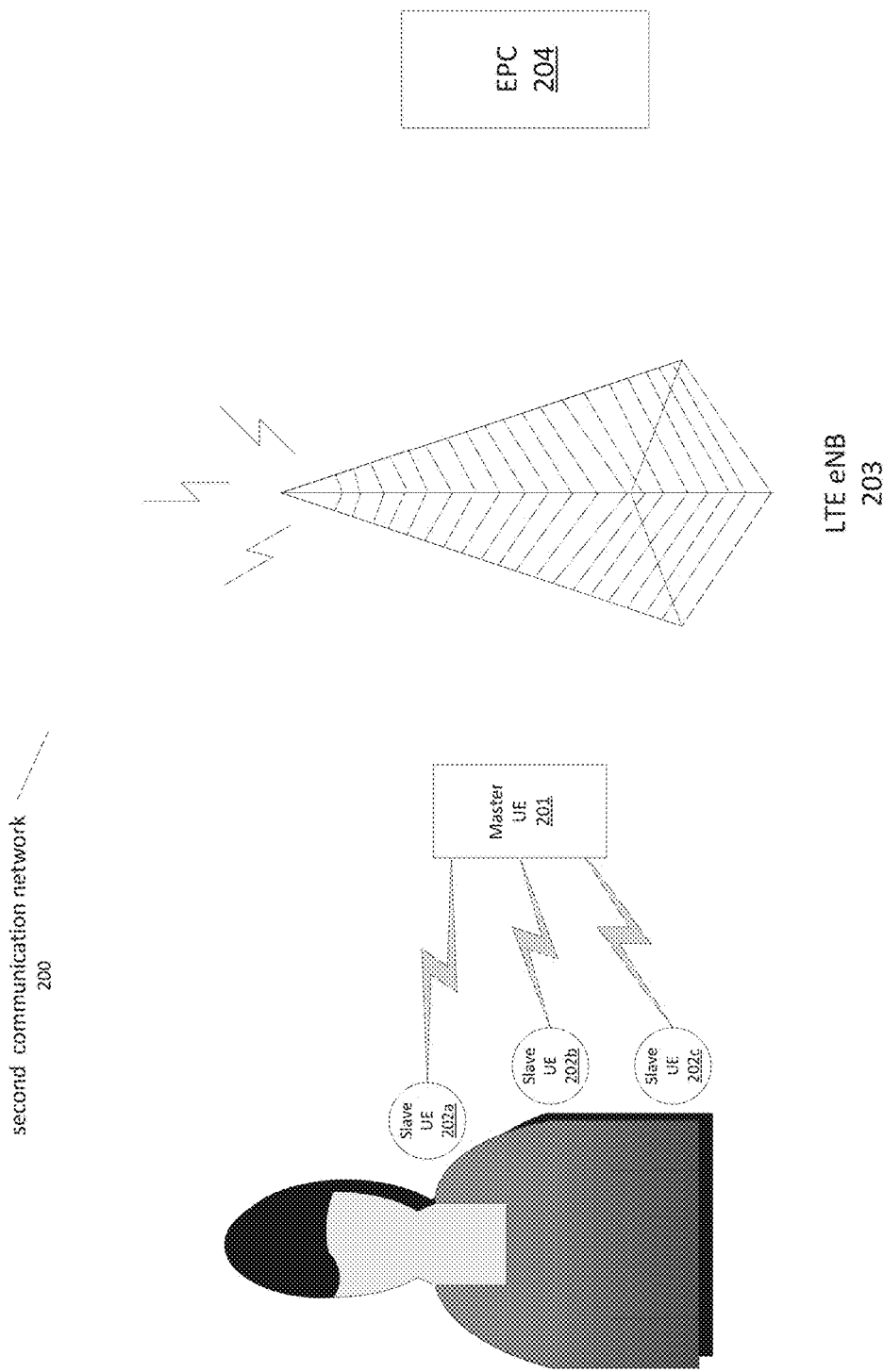
FIG. 2 schematically illustrates a second wireless communication system in accordance with various embodiments.

FIG. 2 schematically illustrates a second wireless communication system in accordance with various embodiments. The second wireless communication system 200 may comprise a master UE 201, a plurality of slave UEs 202a-202c, a LTE eNB 203, and/or others. The master UE 201 may be embodied as, without limitation, a smart phone, a cellular telephone, a tablet, a consumer electronic device, a laptop computer, a notebook computer, a mobile computing system, a processor-based system, and/or any other mobile communication device configured to be used as a small evolved Node B (eNB) for a small cell covering the slave UEs 102a-102c. Any of the slave UEs 102a-102c may be embodied as, without limitation, a low power sensor configured to be served by the master UE to transmit/receive data to/from the LTE eNB 203, such as a meter to measure body temperature, blood pressure, and/or other features of the user. In other embodiments, the slave UEs 102a-102c may be embodies as, without limitation, a smart phone, a cellular telephone, a tablet, a consumer electronic device, a laptop computer, a notebook computer, a mobile computing system, a processor-based system, and/or any other mobile communication device configured to be served by the master UE. The LTE eNB 203 may be a base station bridging between the master UE 201 and the EPC 204 under the LTE standards of 3rd Generation Partnership Project along with any amendments, updates and/or revisions. In some embodiments, although not illustrated in FIG. 2, the EPC 204 may comprise a mobility management entity (MME), a serving-gateway (S-GW), a packet data network-gateway (PDN-GW), a serving GPRS support node (SGSN), etc.

In some embodiments, the master UE 201 may be configured with abilities of serving the slave UEs 202a-202c as a small eNB for transmitting/receiving LTE packets to/from the slave UEs 102a-102c. In order to implement this function, the master UE, which supports frequency division duplex (FDD), may be configured with ability of converting its transmission/receiving frequencies (namely, transmission frequency 1.9 GHz and receiving frequency 2 GHz) as receiving/transmission frequency (namely, receiving frequency 1.9 GHz and transmission frequency 2 GHz), ability of sending broadcasting, synchronization, paging and so on, ability of switching transmission protocol from uplink transmission protocol, such as single carrier, to downlink transmission protocol, such as orthogonal frequency division multiplexing (OFDM), and/or others. In some embodiments, a user interface of the master UE 101 may provide a method, such as a button, for the user to select ON/OFF of switching between normal UE mode and master UE mode.

In some embodiments, the master UE 201 may receive a LTE packet from a slave UE 102a over the small cell. The master UE 201 may modify the LTE packet in order to make it suitable for transmission from the master UE 201 to the LTE eNB 203. For example, the master UE 201 may replace an old header of the LTE packet which is related to the slave UE 202a with a new header which is related to the master UE 201. In order to complete the above, the master UE 201 may record the relationship between an IP address and a MAC address for each slave UE. The master UE 201 may replace the IP address and MAC address of a source slave UE (e.g., the slave UE 202 a) with its own IP address and MAC address before forwarding the LTE packet from the source slave UE to the LTE eNB 203 and vice versa Then, the LTE eNB 203 may further transfer the LTE packet to the EPC 204. It should be understood that although the data transmission between the slave UEs 102a-102c and the EPC 107 has been described in the above, the same or similar concept should be able to be adoptable for the data transmission from the EPC 107 to the slave UEs 102a-102c.

In some embodiments, the master UE 201 may receive a LTE packet call from the LTE eNB 203. In order to handle the LTE packet call, it may be difficult for the master UE 201 to continue serving the slave UEs 202a-202c. In an embodiment, the slave UEs 202a-202c may declare a radio link failure in response that the master UE 201 stops functioning for a predetermined time period. In order to continue serving the slave UEs 202a-202c when the master UE 201 completes its own LTE packet call, the master UE 201 may need to reestablish a radio resource connection (RRC) for communicating LTE packets from/to the slave UEs.

In another embodiment, the master UE 201 may send a radio resource connection (RRC) suspend request to the slave UEs 202a-202c, which may indicate a RRC suspend type and time period. In response to the RRC suspend request, the slave UEs 202a-202c may enter long DRX cycle to avoid declaring the radio link failure during the master UE service absence. If the LTE packet call is not finished before the RRC suspend timer expires, the master UE 201 may send additional RRC suspend message to the slave UEs to extend the RRC suspend time in the ON duration of the slave UEs' DRX cycle. While the master UE sends additional RRC suspend message to the slave UEs during the LTE packet call, it may interrupt the LTE packet call in the ON duration of the slave UEs' DRX cycle. The slave UE may declare radio link failure if it does not receive any new RRC suspend message which may be used to extend the RRC suspend time period before the last RRC suspend timer expires. When the master UE's LTE packet call finishes before the RRC suspend time period expires, the master UE may continue serving the slave UEs without a need of reestablishing the RRC connection with the slave UEs.

An example of defining the RRC suspend request in technical standard (TS) 36.331 may to be proposed as below by broadcasting the information using one of the system information message e.g. SIB2
Signallingradiobearer: N/A
RLC-SAP:TM
Logicalchannel: BCCH
Direction: E-UTRAN to UE RRCconnectionsuspendrequestmessage FIG. 3 schematically illustrates a method of handling communication in the first wireless communication system 100 in accordance with various embodiments. In block 301, the master UE 101 may be switched from an advance UE and configured with ability of serving the plurality of slave UEs 102a-102c, including abilities of serving the slave UEs 102a-102c as the small eNB for transmitting/receiving LTE packets to/from the slave UEs 102a-102c. In order to implementing this function, the master UE may be configured with ability of converting its transmission/receiving frequencies (namely, transmission frequency 1.9 GHz and receiving frequency 2 GHz) as receiving/transmission frequency (namely, receiving frequency 1.9 GHz and transmission frequency 2 GHz), ability of sending broadcasting, synchronization, paging and so on, ability of switching transmission protocol from uplink transmission protocol, such as single carrier, to downlink transmission protocol, such as orthogonal frequency division multiplexing (OFDM), and/or others. In some embodiments, a user interface of the master UE 101 may provide a method, such as a button, for the user to select ON/OFF of switching between the master UE and the advance UE.

In block 302, the master UE 101 may register at the Internet cloud 105 by providing information of identity, address, and/or others. In some embodiments, if the master UE 101 serves any of the slave UE 102a-102c with a billing rate based on a slave UE's data plan which may suggest, for example, the master UE 101 may charge 20% of the data transmission between the slave UEs 102a-102c and the Internet, the master UE 101 may further connect to the billing server 106 via the Internet cloud 105 to transmit control and billing information related to the data plan of the slave UEs and the master UE, the billing server 106 may record the total number of bytes for the data transmission between the slave UEs 102a-102c and the Internet which is served via the Mater UE.

In block 303, the master UE 101 may convert the LTE packet to a TCP/IP packet. For an instance, the master UE 101 may retrieve payload data from the LTE packet and encapsulate the payload data into the TCP/IP packet based on the TCP/IP protocol, such as adding TCP/IP header and address to the payload and so on. In block 304, the master UE may further transmit the TCP/IP packet to the Internet cloud 105 via a local area network including the PC 103 connected with the master UE 101 via an input/output (I/O) port (e.g., an universal serial bus (USB) port), a LAN router 104 connecting the PC 103 to the Internet, and/or others. The Internet cloud 105 may further forward the TCP/IP packet to the EPC 107 which may remove the TCP/IP header added by the master UE and send the original packet (i.e., the data payload) to its final destination.

Figure 4:
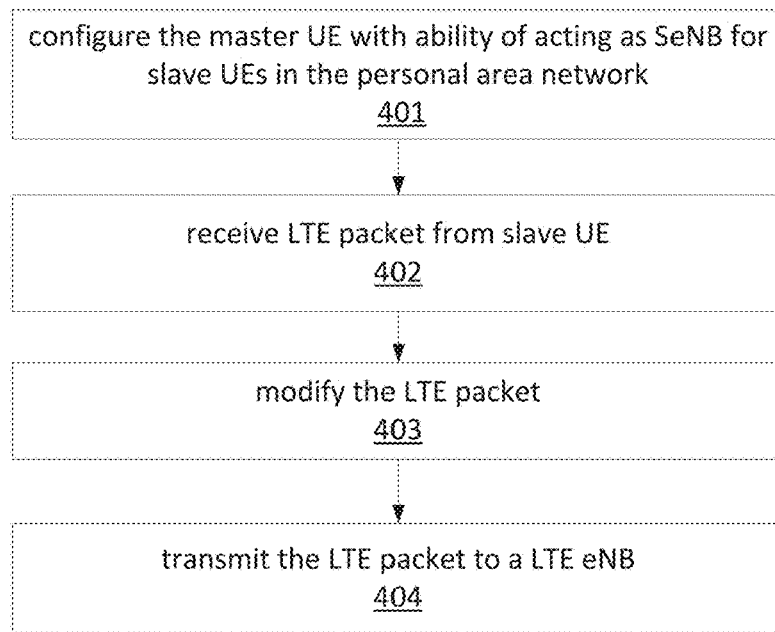
FIG. 4 schematically illustrates a method of handling communications in the second wireless communication system in accordance with various embodiments.

FIG. 4 schematically illustrates a method of handling communications in the second wireless communication system 200 in accordance with various embodiments.

In block 401, the master UE 201 is configured with ability of acting as the SeNB for a personal area network compris-

```
--ASN1START
RRCconnectionSuspendRequest ::= SEQUENCE {
rrcSuspendReq              SEQUENCE {
   rrcSuspendReqType       ENUMERATED {eNB-comm, eNB-restart}
   rrcSuspendReqTimer      ENUMERATED {min1, min2, min4}
   }                                          OPTIONAL, -- Need
}
--ASN1STOP
``` ing the plurality of slave UEs 102a-102c which are located in proximity to the master UE 201 for transmitting LTE packets between the slave UEs 102a-102c and the LTE eNB 203. In order to implementing this function, the master UE 201 may be configured with ability of converting its transmission/receiving frequencies (namely, transmission frequency 1.9 GHz and receiving frequency 2 GHz) as receiving/transmission frequency (namely, receiving frequency 1.9 GB and transmission frequency 2 GB), ability of sending broadcasting, synchronization, paging and so on, ability of switching the transmission protocol from uplink transmission protocol, such as single carrier to downlink transmission protocol, such as orthogonal frequency division multiplexing (OFDM), and/or others. In some embodiments, a user interface of the master UE 201 may provide a method, such as a button, for the user to select ON/OFF of switching between an ordinary UE to the master UE.

In block 402, the master UE 201 may receive a LTE packet from the slave UE 102a over the small cell. In blocks 403-404, the master UE 201 may modify the LTE packet in order to make it suitable for transmission from the master UE 201 to the LTE eNB 203. For example, the master UE 201 may replace an old header of the LTE packet associated with the slave UE 202a with a new header associated with the master UE 201 In order to complete the above, the master UE may record the relationship between an IP address of and a MAC address for each slave UE. The master UE 201 may replace the IP address and MAC address of a source slave UE (e.g., the slave UE 202 a) with its own IP address and MAC address before forwarding the LTE packet from the source slave UE to the LTE eNB 203 and vice versa. Then, the LTE eNB 203 may further transfer the LTE packet to the EPC 204. It should be understood that although the data transmission between the slave UEs 102a-102c and the EPC 107 has been described in the above, the same or similar concept should be able to be adoptable for the data transmission from the EPC 107 to the slave UEs 102a-102c.

Figure 5:
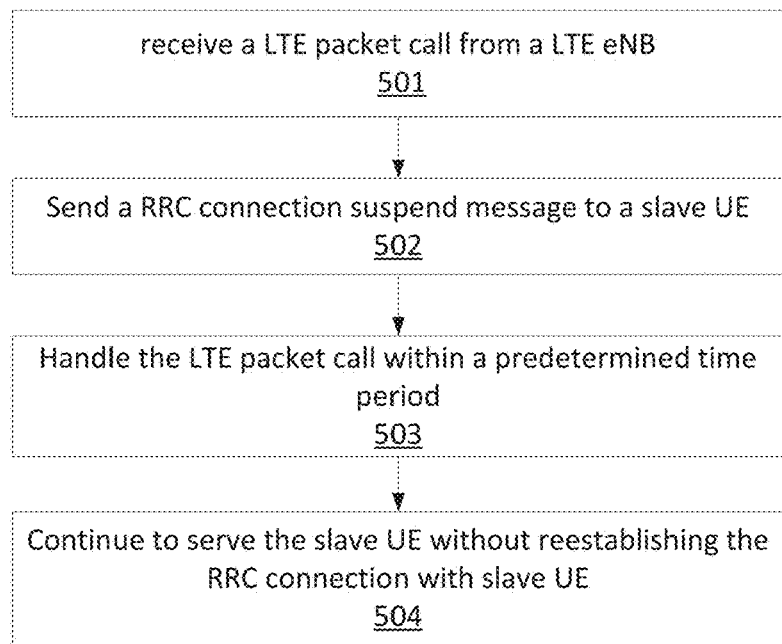
FIG. 5 schematically illustrates another method of handling communications in the second wireless communication system in accordance with various embodiments.

FIG. 5 schematically illustrates a method of handling communications in the second wireless communication system 200 in accordance with various embodiments.

In some embodiments, in block 501, the master UE 201 may receive a LTE packet call from the LTE eNB 203. In order to handle the LTE packet call, it may be difficult for the master UE 201 to continue serving the slave UEs 202a-202c. In some embodiment, the master UE 201 may send a radio resource connection (RRC) suspend request to the slave UEs 202a-202c, which may indicate a RRC suspend type and time period. In block 503, the master UE 201 may handle the packet call within the time period. In block 504, when the time period expires, the master UE may continue serving the slave UEs without a need of reestablishing the RRC connection with the slave UEs.

Figure 6:
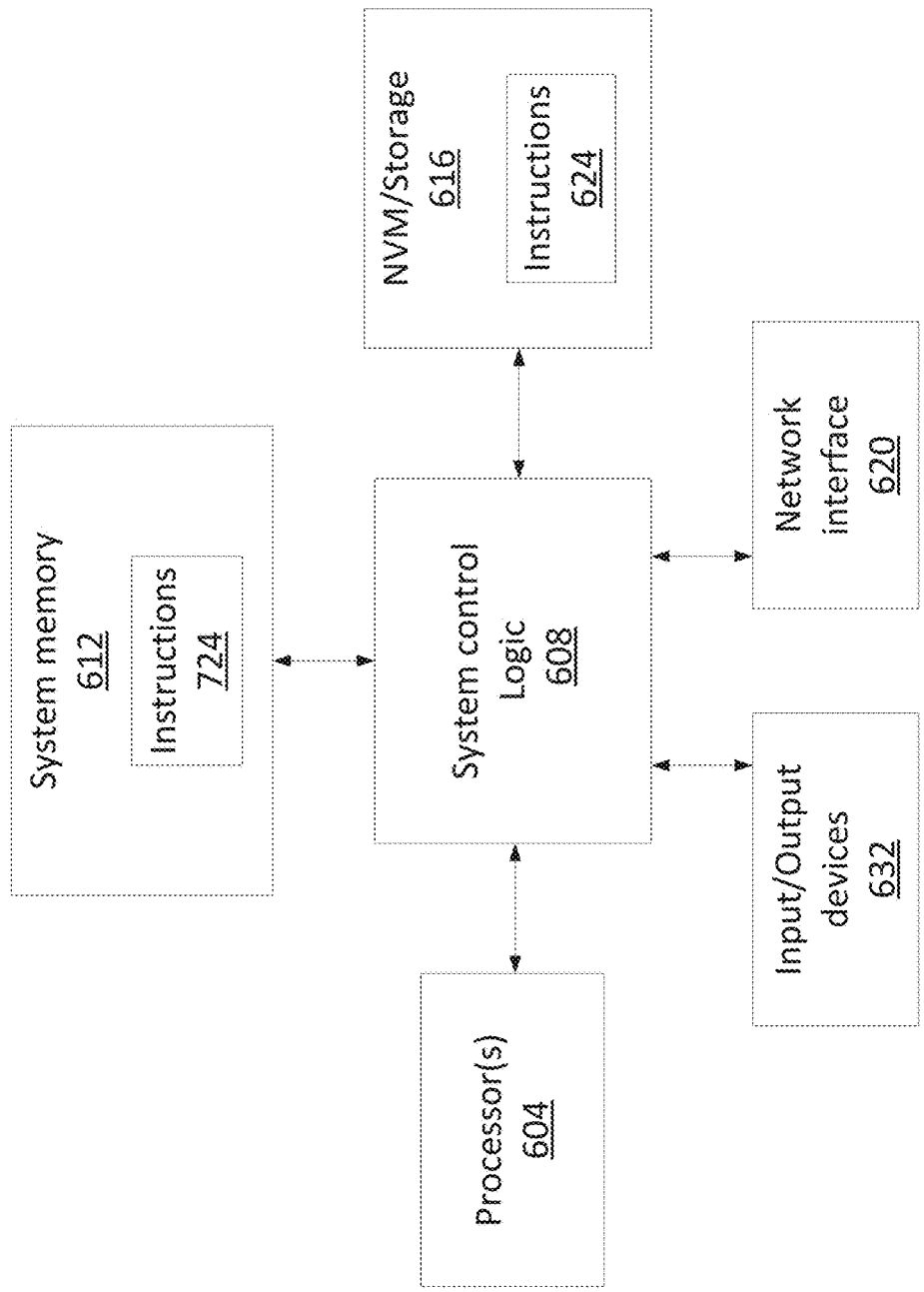
FIG. 6 schematically illustrates an example system in accordance with various embodiments.

FIG. 6 schematically illustrates an example system in accordance with various embodiments. In an embodiment, the system 600 may comprise one or more processor(s) 604, system control logic 608 coupled with at least one of the processor(s) 604, system memory 612 coupled with system control logic 608, non-volatile memory (NVM)/storage 616 coupled with system control logic 608, and a network interface 620 coupled with system control logic 608.

Processor(s) 604 may include one or more single-core or multi-core processors. Processor(s) 604 may include any combination of general-purpose processors and dedicated processors (e.g., graphics processors, application processors, baseband processors, etc.). In an embodiment in which the system 600 implements the master UE 101, processors(s) 604 may be configured to execute one or more embodiment(s) as illustrated in FIGS. 1 and 3 in accordance with various embodiments. In an embodiment in which the system 600 implements the master UE 201, processors(s) 604 may be configured to execute one or more embodiment (s) as illustrated in FIGS. 2, 4 and 5 in accordance with various embodiments.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620.

System memory 612 and NVM/storage 616 may respectively include, in particular, temporal and persistent copies of instructions 624. Instructions 624 may include instructions that when executed by at least one of the processor(s) 604 result in the system 600 implementing the method as described with reference to FIG. 6. In various embodiments, instructions 624, or hardware, firmware, and/or software components thereof, may additionally/alternatively be located in the system control logic 608, the network interface 620, and/or the processor(s) 604.

Network interface 620 may include a radio frequency module (RF module), a baseband module, a LTE module, a WiFi module, and so on to provide a radio interface for system 600 to communicate over one or more network(s) and/or with any other suitable device. In various embodiments, the network interface 620 may be integrated with other components of system 600. For example, the network interface may include a processor of the processor(s) 604, memory of the system memory 612, NVM/Storage of NVM/Storage 616, and/or a firmware device (not being illustrated) having instructions that when executed by at least one of the processor(s) 604 result in the system 600 implementing the method as described with reference to FIG. 6.

Network interface 620 may further include any suitable hardware and/or firmware, such as a plurality of antennas to provide a multiple input, multiple output radio interface. Network interface 620 for one embodiment may be, for example, a network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

The system 600 may further include input/output (I/O) devices 632. The I/O devices 632 may include user interfaces designed to enable user interaction with the system 600, peripheral component interfaces designed to enable peripheral component interaction with the system 600, and/or sensors designed to determine environmental conditions and/or location information related to the system 600.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

The disclosure may include various example embodiments disclosed below.

In example embodiment 1, a method for using a first user equipment (UE) as a small evolved NodeB (eNB) for a small cell may comprise receiving a first long term evolution (LTE) packet from a second UE over the small cell; converting the first LTE packet into a first transmission control protocol/Internet protocol (TCP/IP) packet, wherein the converting includes retrieving payload data from the first LTE packet and encapsulating the payload data into the first TCP/IP packet by adding a TCP/IP header to the payload data, and wherein the TCP/IP header includes an IP address of an Evolved Packet Core (EPC) network associated to Internet based on a TCP/IP tunneling protocol; and transmitting the first TCP/IP packet to an Internet destination via the EPC connected with the first UE through an Internet server over a local area network (LAN).

In example embodiment 2, the method according to the example embodiment 1 may comprise receiving a second TCP/IP packet from the Internet server over the LAN, wherein the second TCP/IP packet was either forwarded from the EPC network or directly from the Internet destination; converting the second TCP/IP packet into a second LTE packet; and transmitting the second LTE packet to the second UE over the small cell.

In example embodiment 3, the method according to any of the example embodiments 1-2, may comprise configuring the UE with ability of converting transmission/receiving frequencies of one LTE component carrier, in order to transmit/receive the first LTE packet or the second LTE packet to/from the slave UE.

In example embodiment 4, the method according to any of the example embodiments 1-3, may comprise registering at the EPC network via the Internet server by providing an identity and a data plan associated with the first UE, and/or an identify and a data plan associated with the second UE; and charging, to a billing server connected with the Internet cloud, for transmitting the first and second LTE packets from the second UE to the EPC and/or receiving the first and second TCP/IP packet, based on the data plan associated with the second UE.

In example embodiment 5, the method according to any of the example embodiments 1-4, the first TCP/IP packet may be transmitted to the Internet server via a computer connected with the UE.

In example embodiment 6, the method according to any of the example embodiments 1-5, the master UE may be a mobile device equipped with a modem having a LTE module and a LAN module.

In example embodiment 7, a first user equipment (UE) used as a small evolved NodeB (eNB) for a small cell, may comprise a processor; and one or more machine readable media having instructions stored there on that, when being executed by the one or more processors, cause the master UE to perform the method of: receiving a first long term evolution (LTE) packet from a second UE over the small cell; converting the first LTE packet into a first transmission control protocol/Internet protocol (TCP/IP) packet, wherein the converting includes retrieving payload data from the first LTE packet and encapsulating the payload data into the first TCP/IP packet by adding a TCP/IP header to the payload data, and wherein the TCP/IP header includes an IP address of an Evolved Packet Core (EPC) network associated to Internet based on a TCP/IP tunneling protocol; and transmitting the first TCP/IP packet to an Internet destination via the EPC connected with the first UE through an Internet server over a local area network (LAN).

In example embodiment 8, the instructions according to the example embodiment 7 may further cause the master UE to perform the method of: configuring the UE with ability of converting transmission/receiving frequencies of one component carrier, in order to transmit/receive the first LTE packet or the second LTE packet to/from the second UE.

In example embodiment 9, the instructions according to any of the example embodiment 7-8 may further comprise registering at the EPC network via the Internet cloud by providing an identity and a data plan associated with the first UE, and/or an identify and a data plan associated with the second UE; and charging, to a billing server connected with the Internet server, for transmitting the first and second LTE packets from the second UE to the EPC and/or receiving the first and second TCP/IP packet, based on the data plan associated with the second UE.

In example embodiment 10, the first TCP/IP packet according to any of example embodiments 7-9 may be transmitted to the Internet server via a computer connected with the UE.

In example embodiment 11, the first UE according to any of example embodiments 7-10 may be a mobile device equipped with a modem having a LTE module and a LAN module.

In example embodiment 12, a method employed by a first user equipment (UE) used as a small evolved NodeB (eNB) for a small cell, may comprise receiving a first long term evolution (LTE) packet from a second UE over the small cell; converting the first LTE packet into a second LTE packet, wherein a header of the first LTE packet which is associated to the second UE is replaced with a header of the second LTE packet associated to the first UE, wherein the header of the first LTE packet comprises an internet protocol (IP) address and a media access control (MAC) address associated with the second UE, and the header of the second LTE packet comprises an IP address and a MAC address associated with the first UE; and transmitting the second LTE packet to a first eNB over a macro cell.

In example embodiment 13, the method according to example embodiment 12 may further comprise receiving a LTE packet call from the macro eNB; and transmitting, in response to the LTE packet call, a first radio resource control (RRC) connection suspend request to the second UE, to inform that the first UE is not available for a first time period indicated in the RRC connection suspend request.

In example embodiment 14, the method according to any of example embodiments 12-13 may further comprise continuing serving the second UE after the first time period expires, without reestablishing the RRC connection.

In example embodiment 15, the method according to any of example embodiments 12-14 may further comprise handling the LTE packet call during the time period.

In example embodiment 16, a method according to any of example embodiments 12-15 may further comprise in response that the LTE packet call cannot be finished within the first time period indicated in the first RRC connection suspend request, transmitting a second radio resource control (RRC) connection suspend request to the second UE, to inform that the master UE is not available for a second time period indicated in the second RRC connection suspend request.

In example embodiment 17, a first user equipment (UE) used as a small evolved NodeB (eNB) for a small cell may comprise a processor; and one or more machine readable media having instructions stored there on that, when being executed by the one or more processors, cause the first UE to perform the method of: receiving a first long term evolution (LTE) packet from a second UE over the small cell; converting the first LTE packet into a second LTE packet, wherein a header of the first LTE packet which is associated to the second UE is replace with a header of the second LTE packet associated to the master UE, wherein the header of the first LTE packet comprises an internet protocol (IP) address and a media access control (MAC) address associated with the second UE, and the header of the second LTE packet comprises an IP address and a MAC address associated with the first UE; and transmitting the second LTE packet to a macro eNB over a macro cell.

In example embodiment 18, the instruction according to example embodiment 17 may further cause the first UE to: receive a LTE packet call from the macro eNB; transmit, in response to the LTE packet call, a first radio resource control (RRC) connection suspend request to the second UE, to inform that the first UE is not available for a first time period indicated in the RRC connection suspend request.

In example embodiment 19, the instruction according to any of example embodiments 17-18 may further cause the master UE to: continue serving the second UE after the first time period expires, without reestablishing the RRC connection.

In example embodiment 20, the instruction according to any of example embodiments 17-19 may further cause the first UE to: handle the LTE packet call during the first time period.

In example embodiment 21, the instruction according to any of example embodiments 17-20 may further cause the first UE to: in response that the LTE packet call cannot be finished within the first time period indicated in the first RRC connection suspend request, transmitting a second radio resource control (RRC) connection suspend request to the second UE, to inform that the first UE is not available for a second time period indicated in the second RRC connection suspend request.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method for using a user equipment (UE) as a small evolved NodeB (eNB) for a small cell, comprising:
   receiving a first long term evolution (LTE) packet from another UE over the small cell;
   converting the first LTE packet into a first transmission control protocol/Internet protocol (TCP/IP) packet, wherein the converting includes retrieving payload data from the first LTE packet and encapsulating the payload data into the first TCP/IP packet by adding a TCP/IP header to the payload data based on a TCP/IP tunneling protocol, and wherein the TCP/IP header includes a global IP address of an Evolved Packet Core (EPC) and the global IP address is an IPv4 or IPv6 address; and
   transmitting the first TCP/IP packet to an Internet destination via the EPC connected with the UE through an Internet server over a Local Access Network (LAN).

2. The method of claim 1, further comprising:
   receiving a second TCP/IP packet from the Internet destination via the EPC;
   converting the second TCP/IP packet into a second LTE packet; and
   transmitting the second LTE packet to the another UE over the small cell.

3. The method of claim 2, further comprising:
   configuring the UE with ability of converting transmission and receiving frequencies of one LTE component carrier into receiving and transmission frequencies of the one LTE component carrier, in order to receive the first LTE packet from the another UE and transmit the second LTE packet to the another UE.

4. The method of claim 1, further comprising:
   registering at the EPC via the Internet server by providing an identity of the UE and a data plan associated with the another UE; and
   charging, to a billing server based on the data plan associated with the another UE, for data transmission between the another UE and the EPC through providing control and billing information for the billing server to record total number of bytes for the data transmission, wherein the UE is connected with the billing server via the Internet server.

5. The method of claim 1, wherein the first TCP/IP packet is transmitted to the Internet server via a computer connected with the UE.

6. The method of claim 5, wherein the first UE is a mobile device equipped with a modem having an LTE module.

7. A user equipment (UE) to be used as a small evolved NodeB (eNB) for a small cell, comprising:
   a processor;
   a transceiver to receive a first long term evolution (LTE) packet from another UE over the small cell;
   a circuitry to convert the first LTE packet into a first transmission control protocol/Internet protocol (TCP/IP) packet, wherein the circuitry is further to retrieve payload data from the first LTE packet and encapsulate the payload data into the first TCP/IP packet by adding a TCP/IP header to the payload data based on a TCP/IP tunneling protocol, and wherein the TCP/IP header includes a global IP address of an Evolved Packet Core (EPC) network and the global IP address is an IPv4 or IPv6 address; and wherein the transceiver is further to transmit the first TCP/IP packet to an Internet destination via the EPC connected with the UE through an Internet server over a local area network (LAN).

8. The UE of claim 7, wherein the transceiver is further to receive a second TCP/IP packet from the Internet destination via the EPC and transmit the second TCP/IP packet to the another UE over the small cell, and the circuitry is further to convert the second TCP/IP packet into a second LTE packet.

9. The UE of claim 7, wherein the circuitry is further to configure the UE with ability of converting transmission and receiving frequencies of one LTE component carrier into receiving and transmission frequencies of the one LTE component carrier, in order to receive the first LTE packet from the another UE and transmit the first LTE packet to the another UE.

10. The UE of claim 7, wherein the transceiver is further to register at the EPC via the Internet server by providing an identity of the UE and a data plan associated with the another UE; and charging, to a billing server based on the data plan associated with the another UE, for data transmission between the another UE and the EPC through providing control and billing information for the billing server to record total number of bytes for the data transmission, wherein the UE is connected with the billing server via the Internet server.

11. The UE of claim 7, wherein the first TCP/IP packet is transmitted to the Internet server via a computer connected with the UE.

12. The UE of claim 7, wherein the UE is a mobile device equipped with a modem having an LTE module and a LAN module.

13. A method to be employed by a user equipment (UE) used as a small evolved NodeB (eNB) for a small cell, comprising:

receiving a first long term evolution (LTE) packet from another UE over the small cell;

converting the first LTE packet into a second LTE packet, wherein a header of the first LTE packet which is associated to the another UE is replaced with a header of the second LTE packet associated to the UE, wherein the header of the first LTE packet comprises an internet protocol (IP) address and a media access control (MAC) address associated with the another UE, and the header of the second LTE packet comprises an IP address and a MAC address associated with the UE; and transmitting the second LTE packet to a macro eNB over a macro cell.

14. The method of claim 13, further comprising:
receiving an LTE packet call from the macro eNB; and
transmitting, in response to the LTE packet call, a first radio resource control (RRC) connection suspend request to the another UE, to inform that the UE is not available for a first time period indicated in the RRC connection suspend request.

15. The method of claim 14, further comprising:
continuing serving the another UE after the first time period expires, without reestablishing the RRC connection.

16. The method of claim 14, further comprising:
handling the LTE packet call during the first time period.

17. The method of claim 14, wherein in response that the LTE packet call cannot be finished within the first time period indicated in the first RRC connection suspend request, transmitting a second radio resource control (RRC) connection suspend request to the another UE, to inform that the UE is not available for a second time period indicated in the second RRC connection suspend request.

18. A user equipment (UE) to be used as a small evolved NodeB (eNB) for a small cell, comprising:

one or more processors; and
one or more device readable media having instructions stored there on that, when being executed by the one or more processors, cause the UE to:

receive a first long term evolution (LTE) packet from another UE over the small cell;

convert the first LTE packet into a second LTE packet, wherein a header of the first LTE packet which is associated to the another UE is replaced with a header of the second LTE packet associated to the UE, wherein the header of the first LTE packet comprises an internet protocol (IP) address and a media access control (MAC) address associated with the another UE, and the header of the second LTE packet comprises an IP address and a MAC address associated with the UE; and transmit the second LTE packet to a macro eNB over a macro cell.

19. The UE of claim 18, wherein the instructions further cause the UE to:
receive an LTE packet call from the eNB;
transmit, in response to the LTE packet call, a first radio resource control (RRC) connection suspend request to the another UE, to inform that the UE is not available for a first time period indicated in the RRC connection suspend request.

20. The UE of claim 19, wherein the instructions further cause the UE to:
continue serving the another UE after the first time period expires, without reestablishing the RRC connection.

21. The UE of claim 19, wherein the instructions further cause the UE to:
handle the LTE packet call during the first time period.

22. The UE of claim 19, wherein the instructions further cause the UE to:
in response that the LTE packet call cannot be finished within the first time period indicated in the first RRC connection suspend request, transmit a second radio resource control (RRC) connection suspend request to the other UE, to inform that the UE is not available for a second time period indicated in the second RRC connection suspend request.

* * * * *